Jan. 28, 1958   S. KUBA   2,821,015
ASSEMBLY APPARATUS
Filed Nov. 2, 1953   2 Sheets-Sheet 1

INVENTOR
S. KUBA
BY
W. C. Parnell
ATTORNEY

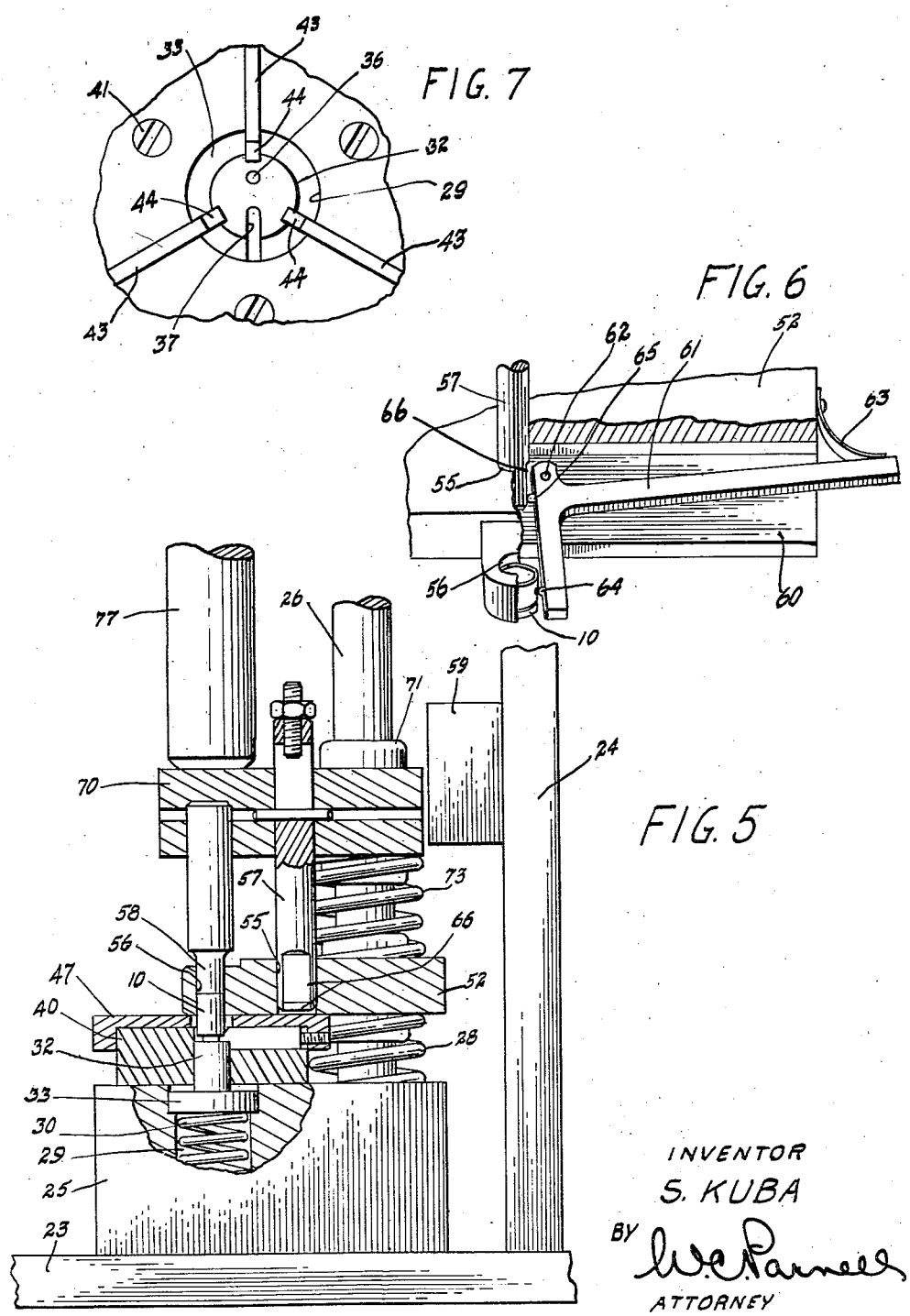

United States Patent Office 2,821,015
Patented Jan. 28, 1958

2,821,015

ASSEMBLY APPARATUS

Samuel Kuba, Allentown, Pa., assignor to Western Electric Company, Incorporated, New York, N. Y., a corporation of New York Application November 2, 1953, Serial No. 389,750

3 Claims. (Cl. 29—203)

This invention relates to apparatus for assembling articles and more particularly to apparatus for assembling sleeves to stems of cartridge transistors.

In the manufacture of cartridge transistors, the three main portions of the transistor, particularly the two which are disposed in the opposing ends of the sleeve must be oriented accurately. Owing to the fact that the two units cannot be assembled simultaneously in the sleeve, it is necessary to provide some portion of the sleeve with respect to which the two units may be oriented while being assembled in their respective ends of the sleeve. Due to the need of an aperture in the sleeve through which location of the units with respect to each other may be observed, it has been determined in the present instance that the aperture of the sleeve may be utilized as a location with respect to which the units may be mounted in the ends of the sleeve.

As the present invention relates to the assembly of a sleeve and a stem unit, the object of this invention is an apparatus which is simple in structure and highly efficient in assembling a sleeve to a stem and assuring accurate orientation thereof.

With this and other objects in view, the invention comprises an apparatus for assembling a sleeve to a stem having a member adapted to enter and close one end of the sleeve, the apparatus including a support to hold the stem in a given position and a member movable relative to the support and adapted to hold the sleeve in alignment with the stem so that it may be forced over the stem. More specifically, the support for the stem includes apertures to receive and hold the stem at a given position while a spring-pressed lever carried by the member for supporting the sleeve, has a projection adapted to enter the aperture of the sleeve, orienting the sleeve with respect to the stem and holding the sleeve in this position until just before it is moved around the stem by a reciprocable tool at which time the lever is actuated to release the sleeve. Crimping tools or elements are disposed adjacent the support for the stem and in the present embodiment of the invention, the support for this stem may be moved downwardly against the force of a spring to move the leading edge of the sleeve against the crimping elements to cause crimping of spaced portions of the edge of the sleeve about the dielectric member of the stem.

Other objects and advantages will be apparent from the following detailed description when considered in conjunction with the accompanying drawings, wherein:

Fig. 5 is a side elevational view of the apparatus (portions thereof being shown in section);

Fig. 6 is a fragmentary isometric view of the sleeve holding means (portions thereof being shown in section), and Fig. 7 is a fragmentary top plan view of the stem support and the crimping elements.

Figure 2:
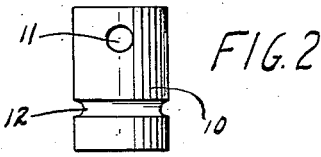
Fig. 2 is a front elevational view of the sleeve.
Figure 3:
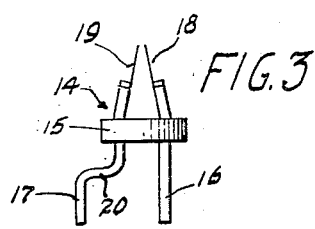
Fig. 3 is a front elevational view of the stem to be assembled in the sleeve.

Referring now to the drawings, attention is first directed to the parts which are to be assembled by the apparatus. Fig. 2 illustrates a sleeve 10 which is open at both ends, provided with an aperture 11 and with an annular crimped portion 12 providing an internal shoulder against which the stem assembly (shown in Fig. 3) may rest. The stem assembly indicated generally at 14, includes a dielectric member 15, adapted for press fit in the lower end of the sleeve 10 and having terminals 16 and 17 extending through apertures therein. The upper ends of the terminals are similar in contour in that they extend diagonally toward each other and have contact wires 18 and 19 fixed thereto and continuing in the diagonal directions of their respective terminal portions to positions short of meeting. The lower portion of the terminal 16 is straight while the lower portion of the terminal 17 is provided with two bends therein including a lateral portion 20.

The apparatus for assembling the sleeve 10 to the stem 14 includes a base 23 with a vertical member 24. A lower member 25 is mounted on the base 23 and is provided with suitable apertures for receiving and supporting guide rods 26, apertures 27 (only one of which is shown) for springs 28 and an aperture 29 for a spring 30. A support 32 for the stem 14 has an enlarged portion 33 resting on the spring 30 and movably disposed in an enlarged upper portion of the aperture 29, this portion of the aperture having a depth greater than the thickness of the portion 33 to permit reciprocable movement of the support a predetermined distance limited by a shoulder 34. The support 32 has an aperture 36 therein to receive the straight terminal 16 and a groove 37 to receive the lateral extending portion 20 of the terminal 17 whereby the dielectric member 15 may rest on the support and the stem 14 will be located at a given position on the support 32.

Figure 4:
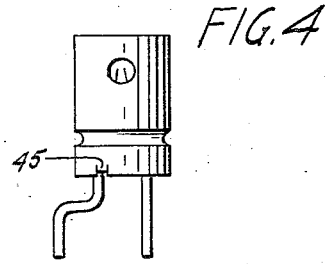
Fig. 4 is a front elevational view of the assembly including the sleeve and stem shown in Figs. 2 and 3.

A member 40 mounted on the lower member 25 by the aid of screws 41 has radial grooves 42 in the upper surface thereof positioned with respect to a central aperture therein to receive the support 32. Crimping elements 43 are disposed in the radial grooves and have tapered inner portions 44 positioned in the path of the leading end of the sleeve 10 when the sleeve is moved with respect to the stem to cause crimping of portions of the sleeve about the dielectric member 15 of the stem as indicated at 45 in Fig. 4. A cover 47 is positioned upon the member 40 and provided with a central aperture 48 to receive the sleeve and the upper end of the support 32. Furthermore, the downwardly projecting rim of the cover 47 carries spaced adjusting screws 50 positioned to engage the outer ends of the crimping elements to adjust the crimping elements relative to the support 32 and the path of the sleeve 10.

An intermediate member 52 is apertured to receive bushings 53 for the guide rods 26. The intermediate member 52 is supported by the springs 28 and has apertures 55 and 56 at spaced positions therein to receive an actuating element 57 and an assembling tool 58, respectively. A stop 59, adjustably mounted on the vertical member 24, is positioned to be engaged by the intermediate member 52 and determine its open position. The intermediate member 52 is provided with a slot 60 extending inwardly from one side thereof to positions including portions of the apertures 55 and 56. An L-shaped lever 61 is disposed in the slot 60, pivoted at 62 and normally urged clockwise by a spring 63. A pin-like projection 64 of the lever is positioned to enter the aperture 11 of each sleeve disposed in the aperture 56, the projection also being of a given size comparable to that in the aperture 11 to assure accurate orientation of the sleeve with respect to the stem disposed on the support 32. A projection 65 is mounted or formed on the lever 61 between its pivot 62 and the projection 64 so as to be engaged by a cam-like surface 66 of the element 57 to actuate the lever counter-clockwise to remove the projection 64 from the aperture 11 of the sleeve 10.

An upper member 70, apertured for bushings 71 through which the guide rods 26 extend and also apertured for rods 72 carried by the intermediate member 52, is supported by springs 73 interposed between the members 52 and 70 concentric with the rods 26 and limited in its movement by the springs upwardly away from the intermediate member by heads 75 of the pins 72. The assembling tool 58 and the actuating element 57 are mounted in suitable apertures in the upper member 70 as shown in Fig. 5. In the present embodiment of the invention, the apparatus is actuated by a piston rod or ram 77 of a fluid actuated cylinder (not shown) mounted on the vertical member 24.

Figure 1:
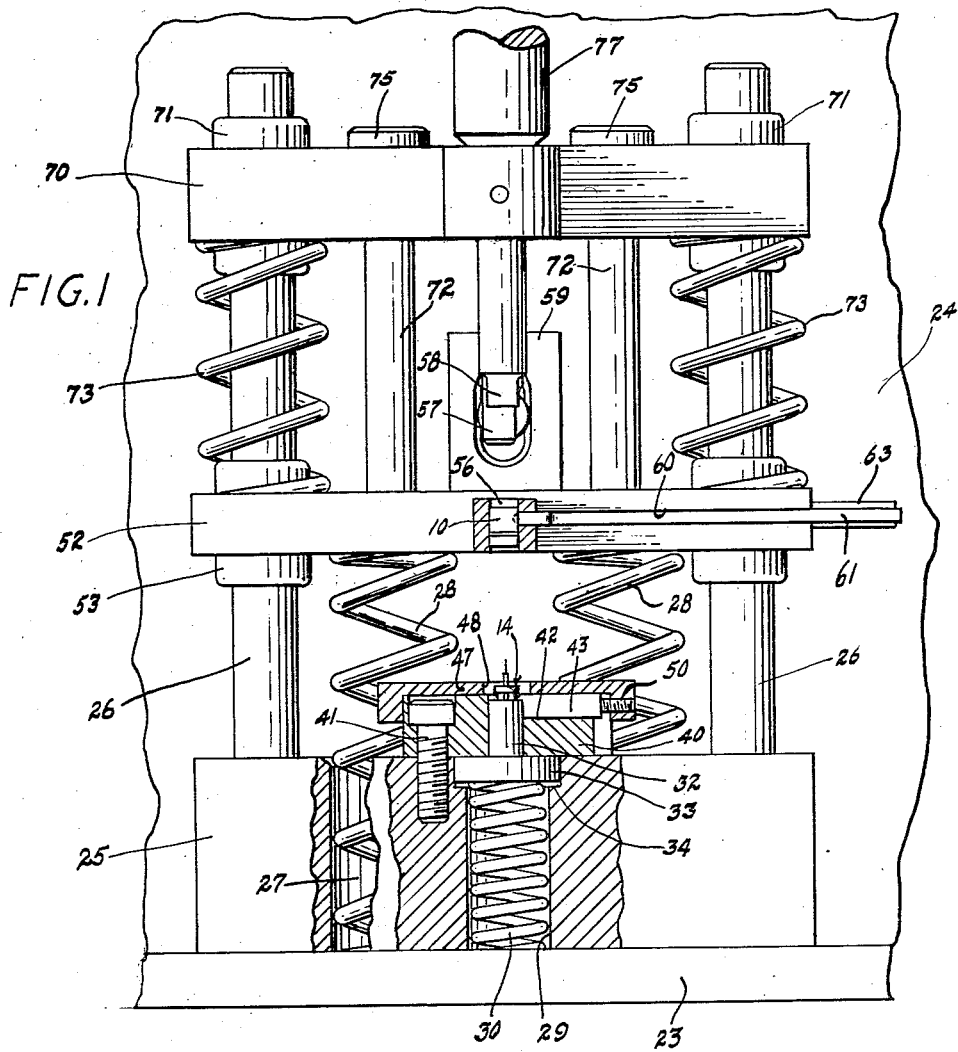
Fig. 1 is a front elevational view of the apparatus, shown in open position (portions thereof being shown in section)

Considering now the operation of the apparatus, Fig. 1 illustrates the apparatus in the open position ready to receive the stems 14 singly on the support 32, the support being constructed so that the stem can be positioned thereon only in a given manner to assure its orientation with respect to the sleeve 10. Positioning of the sleeve 10 in its holder or aperture 56 with the projection 64 of the lever 61 disposed in the aperture 11 of the sleeve will assure accurate location of the sleeve with respect to the stem.

The sizes and structures of the spring 28 and 73 are such that when force is applied to the ram 77, the springs 28 and 73 will start to compress so that the springs 28 will be compressed the full distance between the intermediate member 52 and the cover 47 to position the sleeve 10 accurately with respect to the stem 14 before the element 57 has entered its aperture 55 of the intermediate member a distance sufficient to actuate the lever 61. However, after the intermediate member 52 has become seated or positioned with respect to the cover 47 and more particularly with respect to the support 32, the element 57 will perform its function, in advance of the tool 58, engaging the projection 65 of the lever 61 to actuate the lever against the force of its spring 63 to move the projection 64 out of the aperture 11 of the sleeve, thus freeing the sleeve for movement by the assembling tool 58 during further movement of the upper member 70 by the ram 77.

The assembling tool 58 moves the sleeve 10 to a position where the shoulder provided by the portion 12 rests on the dielectric member 15 but applies further movement to this assembly to move the support 32 against the force of its spring 30 until the enlarged portion 33 rests on the shoulder 34. During this added movement of the sleeve and stem after they have been assembled, the crimping tools or elements 43 disposed in the path of the leading edge of the sleeve cause crimping of spaced portions of this edge about the member 15 locking the stem in the sleeve.

During upward movement of the ram 77, the various portions of the apparatus will operate in a reverse order to that in which they operated during closing of the apparatus. For example, the upper portion or member 70 will move in advance of the intermediate member 52 to bring about removal of the assembling tool 58 from its aperture 56 followed by the removal of the actuating element 57 from its aperture 55. Furthermore, after the upper member and intermediate member have returned to their open positions (shown in Fig. 1) and force is removed from the support 32, the support is returned to its normal position moving the assembly outwardly so that it may be removed from the apparatus.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for assembling a sleeve having an aperture therein to a stem having a portion adapted to enter and close one end of the sleeve, the apparatus comprising a support adapted to receive the stem and hold it in a given position, a sleeve holder supported for movement relative to the support and adapted to position the sleeve in alignment with the stem, an element movably carried by the sleeve holder and adapted to removably enter the aperture of the sleeve to releasably hold and orient the sleeve relative to the stem, an actuator, means responsive to the actuator to move the sleeve holder and element relative to the support to locate the sleeve adjacent the stem, means responsive to the actuator to move the element out of the aperture of the sleeve, and means movable by the actuator to engage and force the sleeve over and its leading end beyond the portion of the stem.

2. An apparatus for assembling a sleeve having an aperture therein to a stem having a portion adapted to enter and close one end of the sleeve, the apparatus comprising a support adapted to receive the stem and hold it in a given position, a sleeve holder supported for movement relative to the support and adapted to position the sleeve in alignment with the stem, an element movably carried by the sleeve holder and adapted to removably enter the aperture of the sleeve to releasably hold and orient the sleeve relative to the stem, an actuator, means responsive to the actuator to move the sleeve holder and element relative to the support to locate the sleeve adjacent the stem, means responsive to the actuator to move the element out of the aperture of the sleeve, means movable by the actuator to engage and force the sleeve over and its leading end beyond the portion of the stem, and a tool fixedly mounted adjacent the support and in the path of the sleeve to crimp the leading end of the sleeve about the portion of the stem.

3. An apparatus for assembling a sleeve having an aperture therein to a stem having a portion adapted to enter and close one end of the sleeve, the apparatus comprising a support adapted to receive the stem and hold it in a given position, a sleeve holder supported for movement relative to the support and adapted to position the sleeve in alignment with the stem, an element movably carried by the sleeve holder and adapted to removably enter the aperture of the sleeve to releasably hold and orient the sleeve relative to the stem, an actuator, means responsive to the actuator to move the sleeve holder and element relative to the support to locate the sleeve adjacent the stem, means responsive to the actuator to move the element out of the aperture of the sleeve, means movable by the actuator to engage and force the sleeve over and its leading end beyond the portion of the stem, a tool fixedly mounted adjacent the support and in the path of the sleeve to crimp the leading end of the sleeve about the portion of the stem, the support being movable, and resilient means to hold the support against movement until the sleeve is forced onto the portion of the stem and subsequently responsive to the actuator and the sleeve moving means to allow movement of the support, sleeve and stem relative to the crimping tool.

References Cited in the file of this patent

UNITED STATES PATENTS

| 821,946 | Marshall | May 29, 1906 |
| 970,669 | Vallone et al. | Sept. 20, 1910 |
| 1,456,617 | Canton | May 29, 1923 |
| 2,572,312 | Burge | Oct. 23, 1951 |

FOREIGN PATENTS

| 357,353 | Great Britain | Sept. 24, 1931 |